United States Patent
Ito

(10) Patent No.: US 7,746,659 B2
(45) Date of Patent: Jun. 29, 2010

(54) ELECTRO-OPTICAL DEVICE AND ELECTRONIC APPARATUS

(75) Inventor: Masaaki Ito, Ina (JP)

(73) Assignee: Seiko Epson Corporation, Tokyo (JP)

( * ) Notice: Subject to any disclaimer, the term of this patent is extended or adjusted under 35 U.S.C. 154(b) by 347 days.

(21) Appl. No.: 12/072,165

(22) Filed: Feb. 25, 2008

(65) Prior Publication Data

US 2008/0225425 A1 Sep. 18, 2008

(30) Foreign Application Priority Data

Mar. 13, 2007 (JP) ............................. 2007-062977

(51) Int. Cl.
*H05K 1/18* (2006.01)
(52) U.S. Cl. ...................... 361/764; 174/250
(58) Field of Classification Search ................ 361/764, 361/704, 707, 708, 720, 709, 715; 359/894; 174/250, 526
See application file for complete search history.

(56) References Cited

U.S. PATENT DOCUMENTS

| 5,710,393 A * | 1/1998 | Smith et al. ................ 174/74 R |
| 7,576,988 B2 * | 8/2009 | Schwarz ...................... 361/704 |
| 2007/0211426 A1 * | 9/2007 | Clayton et al. ............... 361/689 |
| 2008/0218974 A1 * | 9/2008 | Bartley et al. ................ 361/709 |
| 2009/0002951 A1 * | 1/2009 | Legen et al. ................. 361/715 |

FOREIGN PATENT DOCUMENTS

| JP | 6-077361 | 3/1994 |
| JP | 7-254668 | 10/1995 |
| JP | 9-172112 | 6/1997 |
| JP | 10-032305 | 2/1998 |
| JP | 2001-274303 | 10/2001 |
| JP | 2004-252331 | 9/2004 |
| JP | 2005-338706 A | 12/2005 |

* cited by examiner

*Primary Examiner*—Jeremy C Norris
*Assistant Examiner*—Yuriy Semenenko
(74) *Attorney, Agent, or Firm*—AdvantEdge Law Group, LLC

(57) ABSTRACT

The invention provides a heat dissipater such as a heat dissipation member that dissipates heat of an integrated circuit that is formed on a flexible substrate such as a flexible printed circuit board. The heat dissipater according to an aspect of the invention includes; a main body section that is formed in the shape of a hollow sleeve in such a manner that the flexible substrate can be inserted through and inserted inside the main body section; and an adhering section that is formed on an inner surface of the main body section in such a manner that the main body section and the integrated circuit are adhered to each other via the adhering section.

5 Claims, 5 Drawing Sheets

ELECTRO-OPTICAL DEVICE AND ELECTRONIC APPARATUS

BACKGROUND

1. Technical Field

The present invention relates to a heat dissipater such as a heat dissipation member or the like that radiates heat undesirably generated at an integrated circuit that is mounted on a flexible substrate such as a flexible printed circuit board or the like. The flexible printed circuit board to which the heat dissipater according to an aspect of the invention is applied is used, for example, in a liquid crystal device without any intention of limitation thereto. In addition, the invention relates to an electro-optical device that is provided with such a heat dissipater, and further to an electronic apparatus that is provided with such an electro-optical device. A non-limiting example of the electronic apparatus according to an aspect of the invention is a liquid crystal projector.

2. Related Art

In the technical field to which the electro-optical device according to an aspect of the invention pertains, there is an electro-optical device that is mainly made up of an electro-optical panel such as a liquid crystal panel and a flexible printed circuit board on which a driving integrated circuit is mounted. In the typical configuration of the electro-optical device of the related art, the electro-optical panel performs electro-optical operations such as the displaying of images in a pixel region (The pixel region may be hereafter referred to as an "image display region" if the context allows). The driving integrated circuit that is mounted on the flexible printed circuit board constitutes at least a part of a control circuit that drives and/or controls the electro-optical panel. Since at least a part of the control circuit is configured as a discrete component that is separated from the electro-optical panel in the above-described typical configuration of the electro-optical device of the related art, it is possible not only to reduce the absolute size of the electro-optical panel but also to increase the size of the pixel region relative to the size of the electro-optical panel. The integrated circuit, which is provided to drive the electro-optical panel as described above, is mounted on the flexible printed circuit board that is electrically connected to the electro-optical panel. A chip-mounting technique such as a chip-on-film (COF) method is used when the driving integrated circuit is mounted onto the flexible printed circuit board. An example of such a configuration is described in JP-A-2004-252331.

These days, as the processing power of the driving integrated circuit increases, so does the power consumption thereof. Due to the increased power consumption, the amount of heat generated during the operation of the driving integrated circuit is also on the rise. For this reason, there is an adverse and increasing possibility that the thermal runaway and/or the thermal destruction of an electro-optical device may occur because of undesirable heat that is produced by the driving integrated circuit.

SUMMARY

An advantage of some aspects of the invention is to provide a heat dissipater that is capable of radiating heat in an effective manner with a space-saving structure. The invention further provides, as an advantage of some aspects thereof, an electro-optical device that is provided with such a heat dissipater. In addition, the invention further provides, as an advantage of some aspects thereof, an electronic apparatus that is provided with such an electro-optical device.

In order to address the above-identified problem without any limitation thereto, the invention provides, as a first aspect thereof, a heat dissipater that dissipates heat of an integrated circuit that is formed on a flexible substrate, the heat dissipater including; a main body section that is formed in the shape of a hollow sleeve in such a manner that the flexible substrate can be inserted through and inserted inside the main body section; and an adhering section that is formed on an inner surface of the main body section in such a manner that the main body section and the integrated circuit are adhered to each other via the adhering section.

The heat dissipater according to an aspect of the invention has a main body section that is formed in the shape of a hollow sleeve in such a manner that the flexible substrate can be inserted through and inserted inside the main body section; and the heat dissipater according to an aspect of the invention further has an adhering section that is formed on an inner surface of the main body section. The flexible substrate on which the integrated circuit is mounted is inserted through and inserted inside the main body section. The main body section and the integrated circuit are adhered to each other via the adhering section. That is, the flexible substrate and the integrated circuit are, at least partially, covered by the heat dissipater. The main body section is made of a metal having a high thermal conductivity such as, though not limited thereto, copper (Cu) or aluminum (Al). The adhering section is made of an adhering substance that has a comparatively low thermal resistance. A non-limiting typical example of such an adhering substance is an adhesive.

Since the main body section of the heat dissipater according to the first aspect of the invention has the hollow-sleeve shape described above, it is possible to install the heat dissipater in a relatively space-efficient manner while ensuring that the main body section, which functions to dissipate heat, has a relatively large surface area. Thus, the heat dissipater according to the first aspect of the invention makes it possible to produce a high heat-dissipation effect with a space-saving structure. In addition to the above, the heat dissipater according to the first aspect of the invention offers another advantage in that the flexible substrate and the integrated circuit are protected against any kind of mechanical stress that could be applied from the outside of the main body section because the main body section covers the flexible substrate, which is inserted inside the main body section, and the integrated circuit, which are mounted on the flexible substrate.

As explained above, the heat dissipater according to the first aspect of the invention makes it possible to produce a high heat-dissipation effect with a space-saving structure, and in addition thereto, to protect the flexible substrate and the integrated circuit against any kind of mechanical stress that could be applied from the outside of the main body section thereof.

In the configuration of the heat dissipater according to the first aspect of the invention, it is preferable that the main body section should have an open portion that extends along the axial direction of the main body section.

In the above-described preferred configuration, the main body section has an open portion that extends along the axial direction of the main body section. Herein, the term "axial direction" means a direction along which the axis of a sleeve extends on the precondition that the main body section is regarded as the sleeve. In other words, the term "axial direction" means a direction that is the same as, that is, in parallel with, the longitudinal direction of the flexible substrate that is inserted through and inserted inside the main body section. If further paraphrased, the term "axial direction" means a direction along which the flexible substrate extends. That is, in a sectional view, the main body section has a kind of "alphabet C" shape inside which the flexible substrate is inserted through.

Since the main body section of the heat dissipater according to the first aspect of the invention has the open portion described above, it is relatively easy to insert the flexible substrate into the main body section thereof in, for example, the production process of the heat dissipater according to the first aspect of the invention. It should be noted that the width of the open portion could be arbitrarily determined depending on the size of the flexible substrate that is inserted through and inserted inside the main body section, although other factor(s) may be used in addition to or in place of the size of the flexible substrate. Therefore, it is possible to reduce the load of assembly/disassembly work that is necessitated due to the attachment/fixation of the heat dissipater according to the first aspect of the invention.

In the preferred configuration of the heat dissipater described above in which the main body section has an open portion that extends along the axial direction of the main body section, it is further preferable that, in the main body section, the open portion should be formed at a region that includes at least a part of a region opposite to the adhering section.

With such a configuration, since the open portion is formed, in the main body section, at a region that includes at least a part of a region opposite to the adhering section, the integrated circuit, which is adhered to the main body section via the adhering section, is provided on the "rear" surface of the flexible substrate, where the term "rear" is defined as one surface that is remoter from the open portion than the other opposite surface thereof. Therefore, it is possible to protect the integrated circuit against any kind of mechanical stress that could be applied from the outside of the main body section with a further protection effect.

In order to address the above-identified problem without any limitation thereto, the invention provides, as a second aspect thereof, an electro-optical device including: an electro-optical panel; a flexible substrate on which an integrated circuit is mounted, the integrated circuit functioning to drive the electro-optical panel; and the heat dissipater according to the first aspect of the invention described above.

Since the electro-optical device according to the second aspect of the invention is provided with the heat dissipater according to the first aspect of the invention described above, it is possible to effectively dissipate heat that is generated/produced at the integrated circuit that is mounted on the flexible substrate. Therefore, it is possible to provide an electro-optical device that is substantially free from any kind of a malfunction and/or an operation failure/error that is attributable to undesirable heat generated/produced during the operation thereof. Thus, the electro-optical device according to the second aspect of the invention features considerably enhanced operation reliability.

In the configuration of the electro-optical device according to the second aspect of the invention described above, it is preferable that the heat dissipater should be fixed to the electro-optical panel.

In the above-described preferred configuration, the heat dissipater is fixed to the electro-optical panel. Therefore, in such a configuration, the heat dissipater supports the electro-optical panel. For example, a part of the electro-optical panel is fitted in a groove, which is formed at the electro-optical-panel side in the main body section of the heat dissipater. With such a fixation structure, the electro-optical panel is fixedly attached to the heat dissipater.

Since the heat dissipater is fixed to the electro-optical panel as described above, when the electro-optical panel is installed as, for example, a light valve inside an electronic apparatus such as a projector, though not limited thereto, it is possible to determine (i.e., fix) the position of the electro-optical panel in the electronic apparatus, which is easily achieved by attaching the heat dissipater to the electronic apparatus. This means that the electro-optical device according to the second aspect of the invention makes it possible to determine the position of the electro-optical panel in the electronic apparatus without any necessity to attach the electro-optical panel directly to the electronic apparatus. Therefore, as a non-limiting example of advantages thereof, it is possible to avoid the emission of light from being obstructed due to any positional shift or positional deviation of the electro-optical panel, which serves as a light valve, inside the electronic apparatus.

In order to address the above-identified problem without any limitation thereto, the invention provides, as a third aspect thereof, an electronic apparatus that is provided with the electro-optical device according to the second aspect of the invention.

According to an electronic apparatus of this aspect of the invention, it is possible to embody various kinds of electronic devices that is substantially free from any kind of a malfunction and/or an operation failure/error that is attributable to undesirable heat generated/produced during the operation thereof such as, though not limited thereto, thermal runaway and/or thermal destruction because it is provided with the electro-optical device according to the above-described aspect of the invention. Such a variety of electronic devices includes but not limited to a projection-type display device, a television, a mobile phone, an electronic personal organizer, a word processor, a viewfinder-type video recorder, a direct-monitor-view-type video recorder, a workstation, a videophone, a POS terminal, a touch-panel device, and so forth. In addition, as an example of an electronic apparatus of this aspect of the invention, it is possible to embody an electrophoresis apparatus such as an electronic paper. Further in addition, as another example of an electronic apparatus of this aspect of the invention, it is possible to embody a variety of electron emission devices such as a field emission display (FED), a surface-conduction electron-emitter display (SED), and the like. Furthermore, as still another example of an electronic apparatus of this aspect of the invention, it is possible to embody a variety of display devices that adopts such an electrophoresis apparatus or an electron emission device.

These and other features, operations, and advantages of the present invention will be fully understood by referring to the following detailed description in conjunction with the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, exemplary embodiments of the present invention are described below.

Heat Dissipation Member

Figure 1:
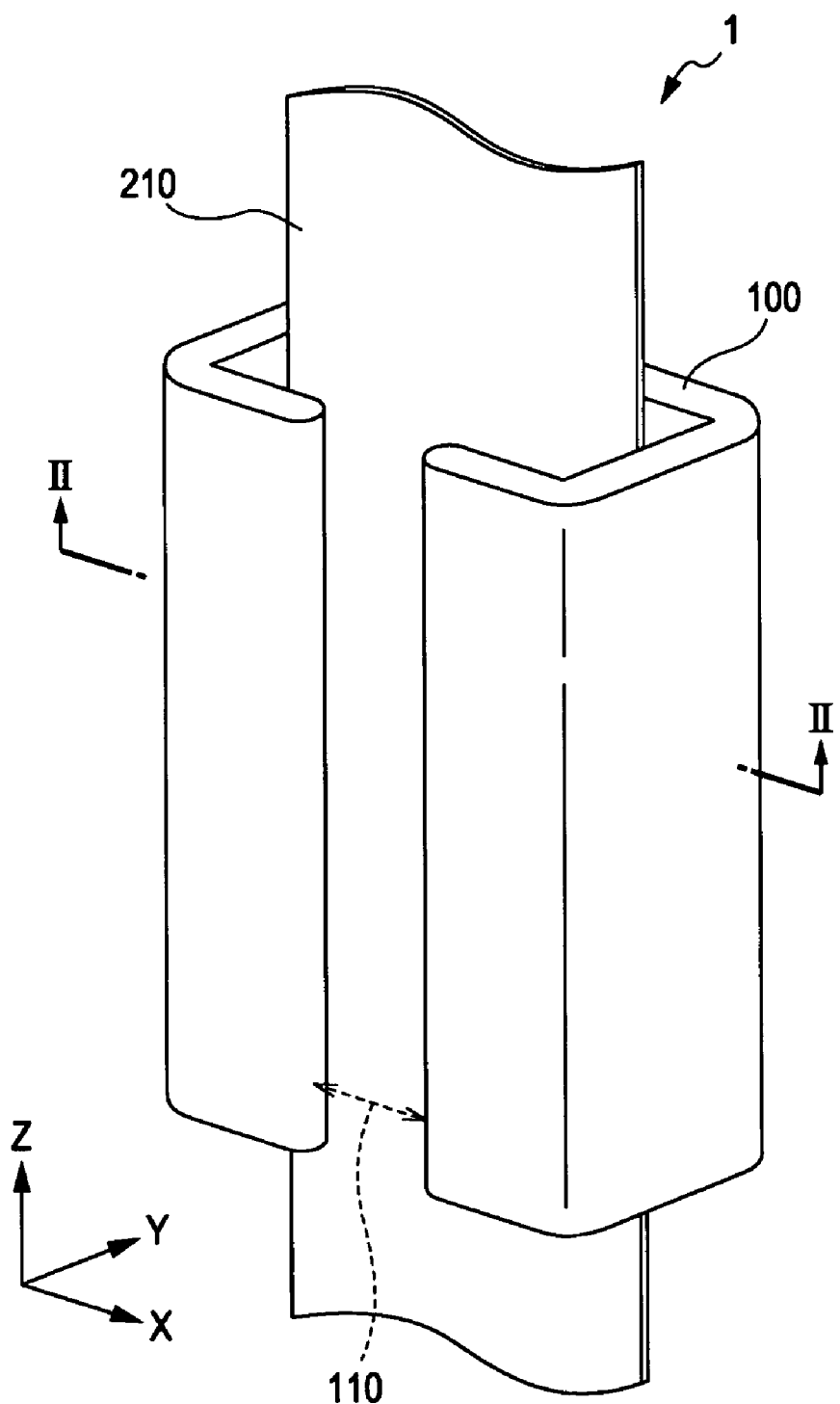
FIG. 1 is a perspective view that schematically illustrates an example of the configuration of a heat dissipation member according to an exemplary embodiment of the invention through which a flexible printed circuit board is inserted.
Figure 2:
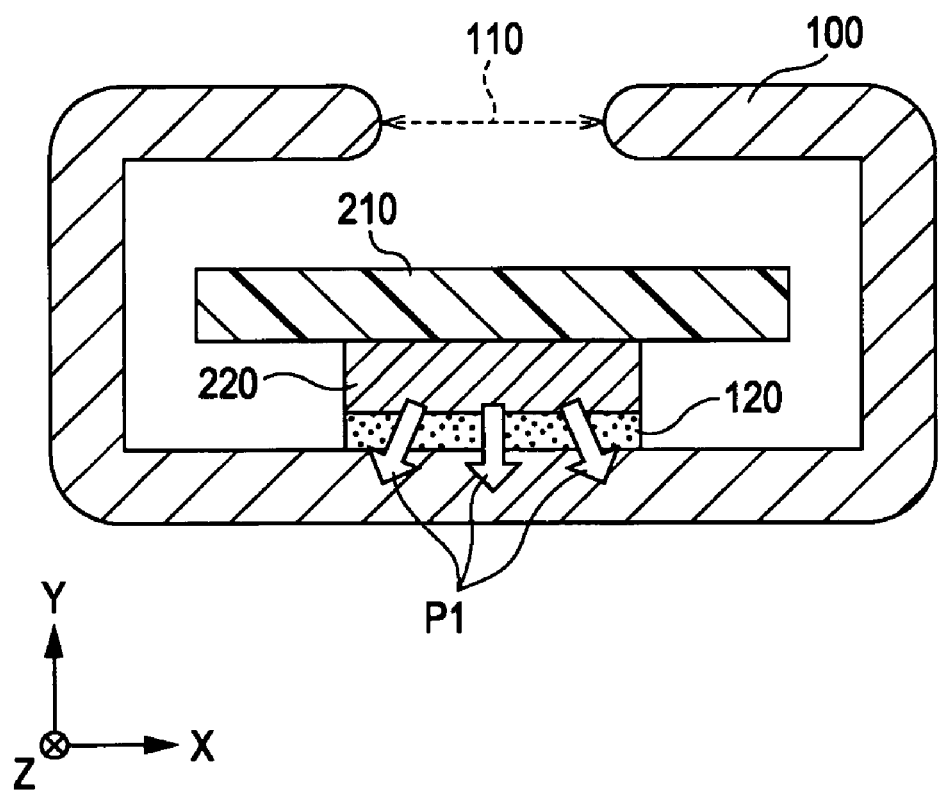
FIG. 2 is a sectional view that schematically illustrates an example of the configuration of the heat dissipation member taken along the X-Y plane of FIG. 1.

First of all, with reference to FIGS. 1 and 2, a heat dissipation member according to the present embodiment of the invention is explained below. FIG. 1 is a perspective view that schematically illustrates an example of the configuration of a heat dissipation member through which a flexible printed circuit board is inserted. FIG. 2 is a sectional view that schematically illustrates an example of the configuration of the heat dissipation member taken along the X-Y plane of FIG. 1.

As illustrated in FIGS. 1 and 2, a heat dissipation member (e.g., heat radiation member, heat release member, though not limited thereto) 1 according to the present embodiment of the invention is provided with, though not necessarily limited thereto, a main body portion 100 and an adhesive portion 120. The main body portion 100 of the heat dissipation member 1 has the shape of a hollow sleeve (e.g., tube). The main body portion 100 has an open portion 110. Herein, the term "sleeve (e.g., tube)" is used to encompass a variety of structures that has a hollow portion inside, has an elongated axis, and that confronts an inserted item at least partially from surrounding sides, and thus not intended to be interpreted restrictively to its customary and specific meaning. A flexible printed circuit board 210, which is a non-limiting example of a flexible substrate, is inserted inside the main body portion 100. The printed circuit board is printed with circuitry including wiring. An integrated circuit 220 is mounted on the flexible printed circuit board 210. The main body portion 100 and the integrated circuit 220 are adhered to each other by means of the adhesive portion 120.

The main body portion 100 is made of a metal having a high thermal conductivity such as, though not limited thereto, copper or aluminum. The main body portion 100 may be made of a singularity of sheet of such a metal plate that is bended into the shape of the hollow sleeve described above. Or, the main body portion 100 may be made of a plurality of sheets of such a metal plate that is welded or joined into the shape of the hollow sleeve described above. Since the main body portion 100 has the open portion 110, it is relatively easy to insert the flexible printed circuit board 210 into the main body portion 100 in, for example, the production process of the heat dissipation member 1 according to the present embodiment of the invention.

The adhesive portion 120 is a bond or other kind of an adhesive having a comparatively low thermal resistance, although the means of adhesion of the invention is not limited to specific ones described herein. Having such a comparatively low thermal resistance, the adhesive portion 120 transfers heat without any substantial resistance between materials or substances that are adhered to each other thereby.

When the integrated circuit 120 is in operation, heat produced at the integrated circuit transfers to the main portion 100 via the adhesive portion 120 (refer to arrow P1 shown in FIG. 2). Then, the main body portion 100 dissipates (i.e., radiates or releases) the heat that has been transferred via the adhesive portion 120 from the integrated circuit 120, the heat generation source, to ambient atmosphere such as air. Since the main body portion 100 of the heat dissipation member 1 according to the present embodiment of the invention has the hollow-sleeve shape described above, it is possible to install the heat dissipation member 1 in a relatively space-efficient manner while ensuring that the main body potion 100, which functions to dissipate heat, has a relatively large surface area. Thus, the heat dissipation member 1 according to the present embodiment of the invention makes it possible to produce a high heat-dissipation effect with a space-saving structure.

In addition to the above, the heat dissipation member 1 according to the present embodiment of the invention offers another advantage in that the flexible printed circuit board 210 and the integrated circuit 220 are protected against any kind of mechanical stress that could be applied from the outside of the main body portion 100 because the main body portion 100 covers the flexible printed circuit board 210, which is inserted inside the main body portion 100, and the integrated circuit 220, which are mounted on the flexible printed circuit board 210. Moreover, in the configuration of the heat dissipation member 1 according to the present embodiment of the invention, the integrated circuit 220, which is especially vulnerable to mechanical stress, is provided on the "rear" surface of the flexible printed circuit board 210, where the term "rear" is defined as one surface that is remoter from the open portion 110 than the other opposite surface thereof. Having such a structure, the heat dissipation member 1 according to the present embodiment of the invention offers an additional protection effect.

Electro-Optical Device

Next, with reference to FIGS. 3, 4, and 5, an electro-optical device that is provided with the heat dissipation member 1 according to the foregoing exemplary embodiment of the invention is explained below. In the following exemplary embodiments of the invention, a liquid crystal device that conforms to a thin-film-transistor (TFT) active-matrix driving scheme is taken as an example of various kinds of electro-optical devices according to the invention. It is assumed that the liquid crystal device explained in the following description is provided with a built-in driving circuit.

First of all, with reference to FIGS. 3 and 4, an explanation is given below of the configuration of a liquid crystal panel, which is a non-limiting example of an "electro-optical panel" that is built in the electro-optical device according to the invention. It should be noted that the liquid crystal panel is electrically connected to the flexible printed circuit board 210 described above. FIG. 3 is a plan view that schematically illustrates an example of the configuration of a liquid crystal panel according to the present embodiment of the invention. FIG. 4 is a sectional view taken along the line IV-IV of FIG. 3.

Figure 3:
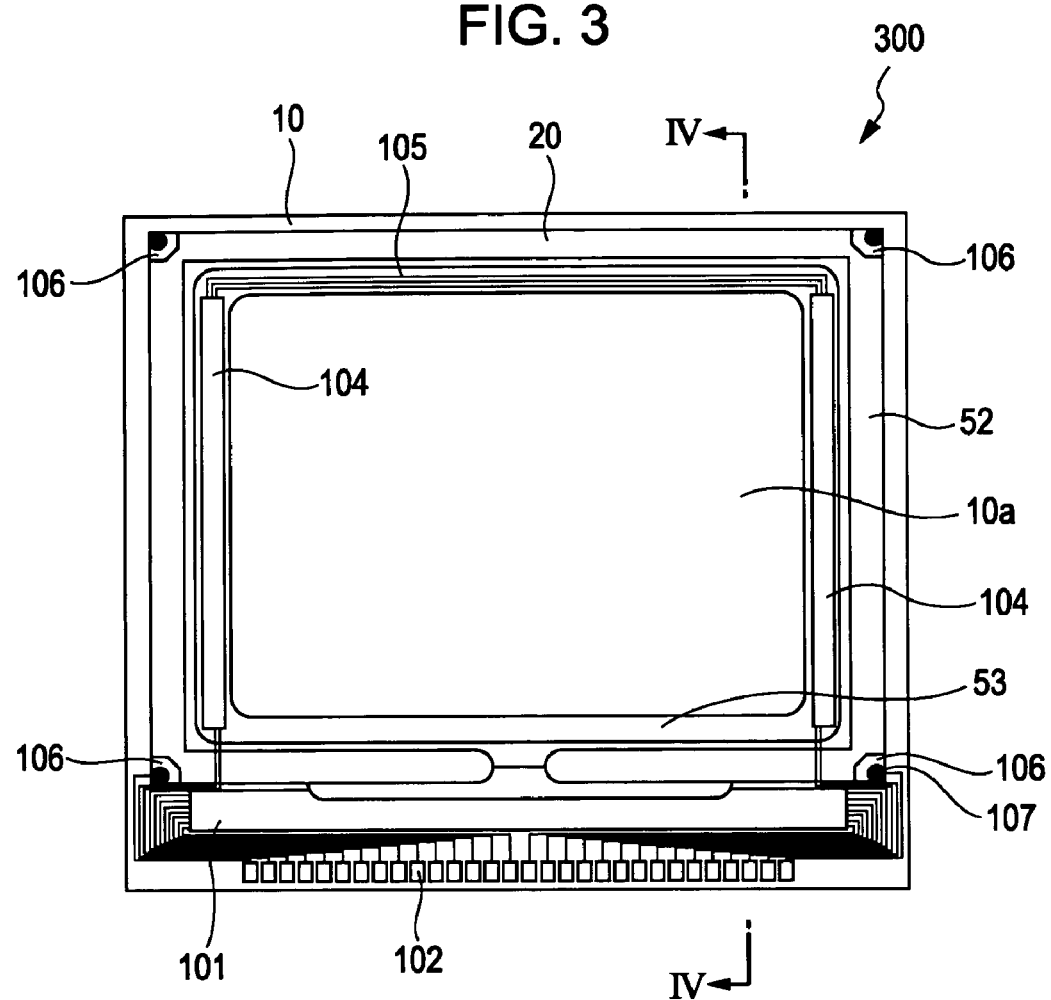
FIG. 3 is a plan view that schematically illustrates an example of the configuration of a liquid crystal panel according to an exemplary embodiment of the invention.
Figure 4:
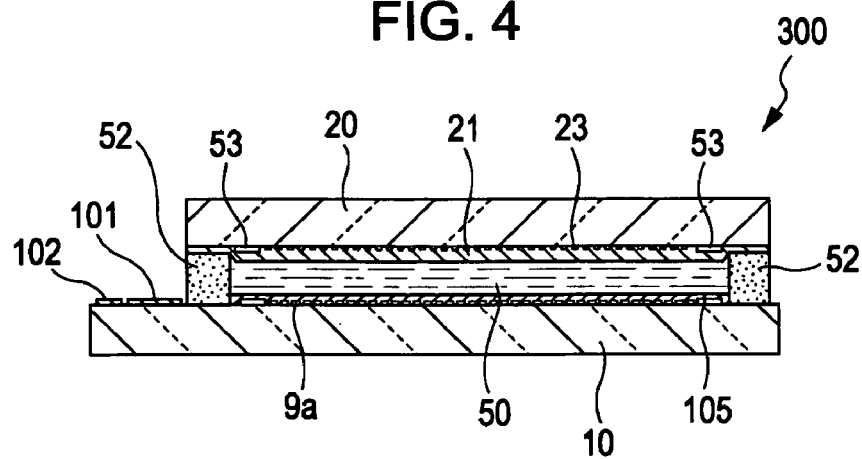
FIG. 4 is a sectional view taken along the line IV-IV of FIG. 3.

As shown in FIGS. 3 and 4, in the configuration of a liquid crystal panel 300 according to the present embodiment of the invention, a TFT array substrate 10 and a counter substrate 20 are arranged opposite to each other. The TFT array substrate 10 is configured as a transparent substrate that is made of, for example, a quartz substrate, a glass substrate, a silicon substrate, or the like. Likewise the TFT array substrate 10, the counter substrate (i.e., opposite substrate) 20 is also a transparent substrate. A liquid crystal layer 50 is sealed between the TFT array substrate 10 and the counter substrate 20. The TFT array substrate 10 and the counter substrate 20 are bonded to each other with the use of a sealant material 52 that is provided at a sealing region around an image display region 10a where a plurality of pixel electrodes are provided.

The sealant material 52 is made from, for example, an ultraviolet (UV) curable resin, a thermosetting resin, or the like, which functions to paste these substrates together. In the production process of the liquid crystal device, the sealant material 52 is applied onto the TFT array substrate 10 and subsequently hardened through an ultraviolet irradiation treatment, a heat treatment, or any other appropriate treatment. A gap material such as glass fibers, glass beads, or the like, are scattered in the sealant material 52 so as to set the distance (i.e., inter-substrate gap) between the TFT array substrate 10 and the counter substrate 20 at a predetermined gap value.

Inside the sealing region at which the sealant material 52 is provided, and in parallel therewith, a picture frame light-shielding film 53, which has a light-shielding property and defines the picture frame region of the image display region 10a, is provided on the counter substrate 20. Notwithstanding the above, a part or a whole of the picture frame light-shielding film 53 may be provided at the TFT array substrate (10) side as a built-in light-shielding film.

Among a plurality of sub-peripheral regions that make up a peripheral region, a data line driving circuit 101 and external circuit connection terminals 102 are provided at one sub-peripheral region which lies outside the sealing region at which the sealant material 52 is provided in such a manner that these data line driving circuit 101 and external circuit connection terminals 102 are provided along one of four sides of the TFT array substrate 10. A pair of scanning line driving circuits 104 is provided along two of four sides thereof that are not in parallel with the above-mentioned one side in such a manner that each of the scanning line driving circuits 104 is enclosed by the picture frame light-shielding film 53. In addition to the above, a plurality of electric wirings 105 is provided along the remaining one side (i.e., one that is parallel with the first-mentioned side) of the TFT array substrate 10 in such a manner that the plurality of electric wirings 105 is enclosed by the picture frame light-shielding film 53 so as to connect one of the pair of the scanning line driving circuits 104 that are provided outside the image display region 10a along the second-mentioned two sides to the other thereof.

Inter-substrate conductive terminals 106, which connect the TFT array substrate 10 with the counter substrate 20 by means of inter-substrate conductive material 107, are provided on the TFT array substrate 10 at positions corresponding to four corners of the counter substrate 20, respectively. With such a structure, it is possible to establish electric conduction between the TFT array substrate 10 and the counter substrate 20.

As illustrated in FIG. 4, a layered structure (i.e., lamination structure) that includes laminations of TFTs for pixel switching, which are driving/driver elements, and of wirings/lines such as scanning lines, data lines, and the like is formed on the TFT array substrate 10. Pixel electrodes 9a are formed at a layer above the lamination structure described above. An orientation film (i.e., alignment film) is deposited on the pixel electrodes 9a. Each of the pixel electrodes 9a is configured as a transparent electrode, which is made of a transparent (electro-) conductive material such as indium tin oxide (ITO) or the like. The alignment film (i.e., orientation film) is made of an organic film such as a polyimide film or the like. On the other hand, a light-shielding film 23 that has either a grid pattern or stripe pattern is formed on the counter substrate 20. A counter electrode 21 is formed on the entire surface of the light-shielded counter substrate 20. At the uppermost layer of a lamination structure formed on the counter substrate 20, an orientation film is formed. The counter electrode 21 is made of a transparent electro-conductive material such as indium tin oxide (ITO) or the like. The alignment film is made of an organic film such as a polyimide film or the like. The TFT array substrate 10 and the counter substrate 20 are adhered to each other so that the pixel electrodes 9a formed on the TFT array substrate 10 and the counter electrode 21 formed on the counter substrate 20 face each other. In addition to other constituent elements described above, the liquid crystal layer 50 is formed between the TFT array substrate 10 and the counter substrate 20. The liquid crystal layer 50 is made of liquid crystal that consists of, for example, a mixture of one or more types of nematic liquid crystal element. Such a liquid crystal takes a predetermined orientation state between a pair of the above orientation films.

It should be noted that other functional circuits may also be provided on the TFT array substrate 10 illustrated in FIGS. 3 and 4 in addition to driving circuits such as the above-described data line driving circuit 101, the scanning line driving circuit 104, and the like, including but not limited to, a sampling circuit that samples an image signal on an image signal line to supply the sampled signal to a data line, a pre-charge circuit that supplies a pre-charge signal having a predetermined voltage level to each of the plurality of data lines prior to the supplying of an image signal, a test circuit for conducting an inspection on the quality, defects, etc., of the electro-optical device during the production process or before shipment, and the like.

Next, with reference to FIG. 5, an example of the general configuration of an electro-optical device according to the present embodiment of the invention is explained below. In addition, an explanation is given of an additional advantageous effect that are offered by a heat dissipater according to the foregoing exemplary embodiment of the invention. FIG. 5 is a perspective view that schematically illustrates an example of the general configuration of an electro-optical device according to the present embodiment of the invention. It should be noted that, in the following description, an explanation of the configuration and the advantageous effects of the heat dissipation member 1 and the flexible printed circuit board 210 that has already been given above while referring to FIGS. 1 and 2 is not repeated so as to omit any redundant explanation thereof.

Figure 5:
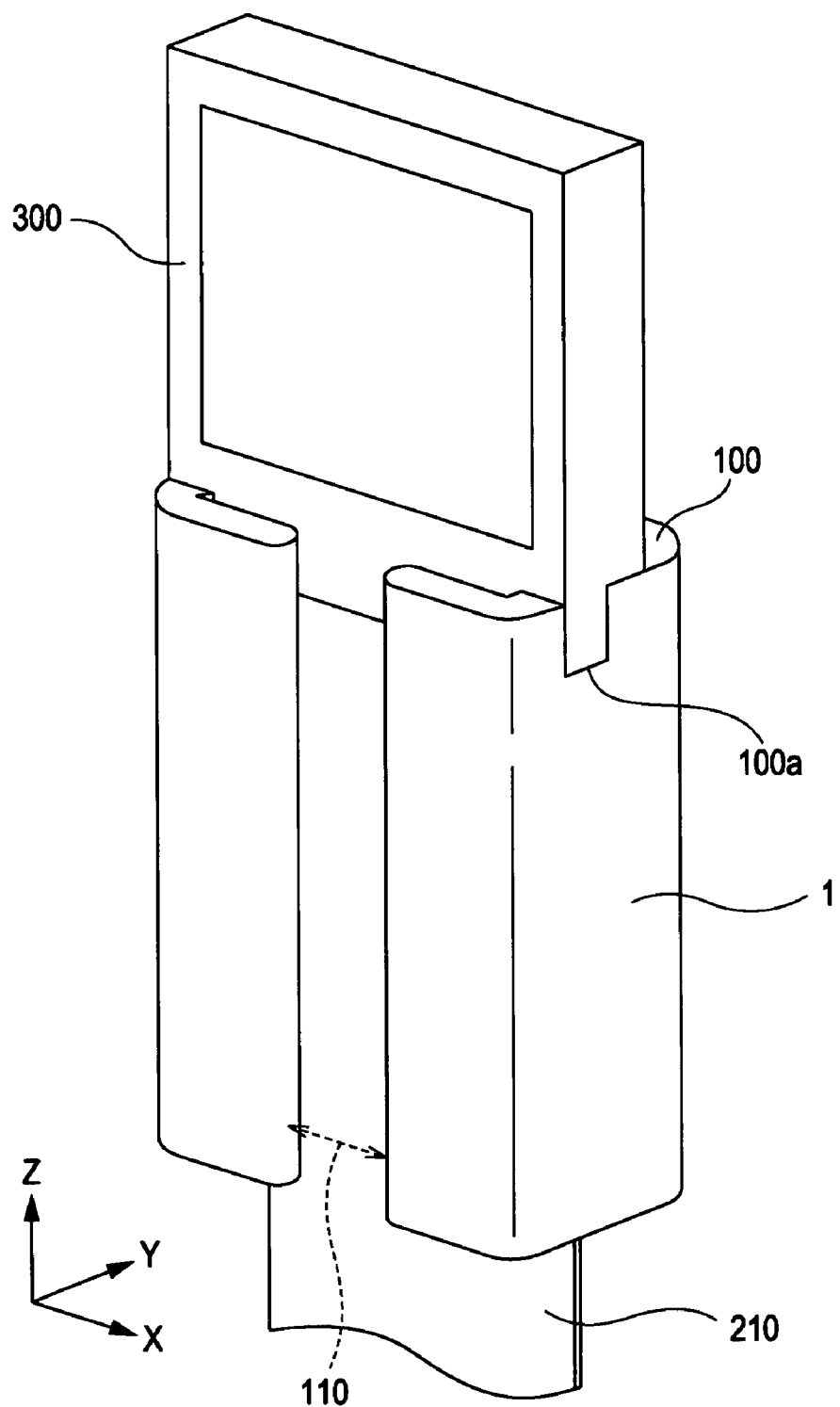
FIG. 5 is a perspective view that schematically illustrates an example of the general configuration of an electro-optical device according to an exemplary embodiment of the invention.

As illustrated in FIG. 5, the above-described liquid crystal panel 300 is electrically connected to the flexible printed circuit board 210 that is inserted through the main body portion 100 of the heat dissipation member 1. The driving integrated circuit 220, which is shown in FIG. 2, drives the liquid crystal panel 300. A part of the liquid crystal panel 300 is fitted in a groove 100a, which is formed in the main body portion 100 of the heat dissipation member 1. With such a fixation structure, the liquid crystal panel 300 is fixedly attached to the heat dissipation member 1.

With such a configuration, when the liquid crystal panel 300 is installed as, for example, a light valve inside an electronic apparatus such as a projector, though not limited thereto, it is possible to determine (i.e., fix) the position of the liquid crystal panel 300 in the electronic apparatus, which is easily achieved by attaching the heat dissipation member 1 to the electronic apparatus. This means that the electro-optical device according to the present embodiment of the invention makes it possible to determine the position of the liquid crystal panel 300 in the electronic apparatus without any necessity to attach the liquid crystal panel 300 directly to the electronic apparatus. Therefore, as a non-limiting example of advantages thereof, it is possible to avoid the emission of light from being obstructed due to any positional shift or positional deviation of the liquid crystal panel 300, which serves as a light valve, inside the electronic apparatus.

Electronic Apparatus

Figure 6:
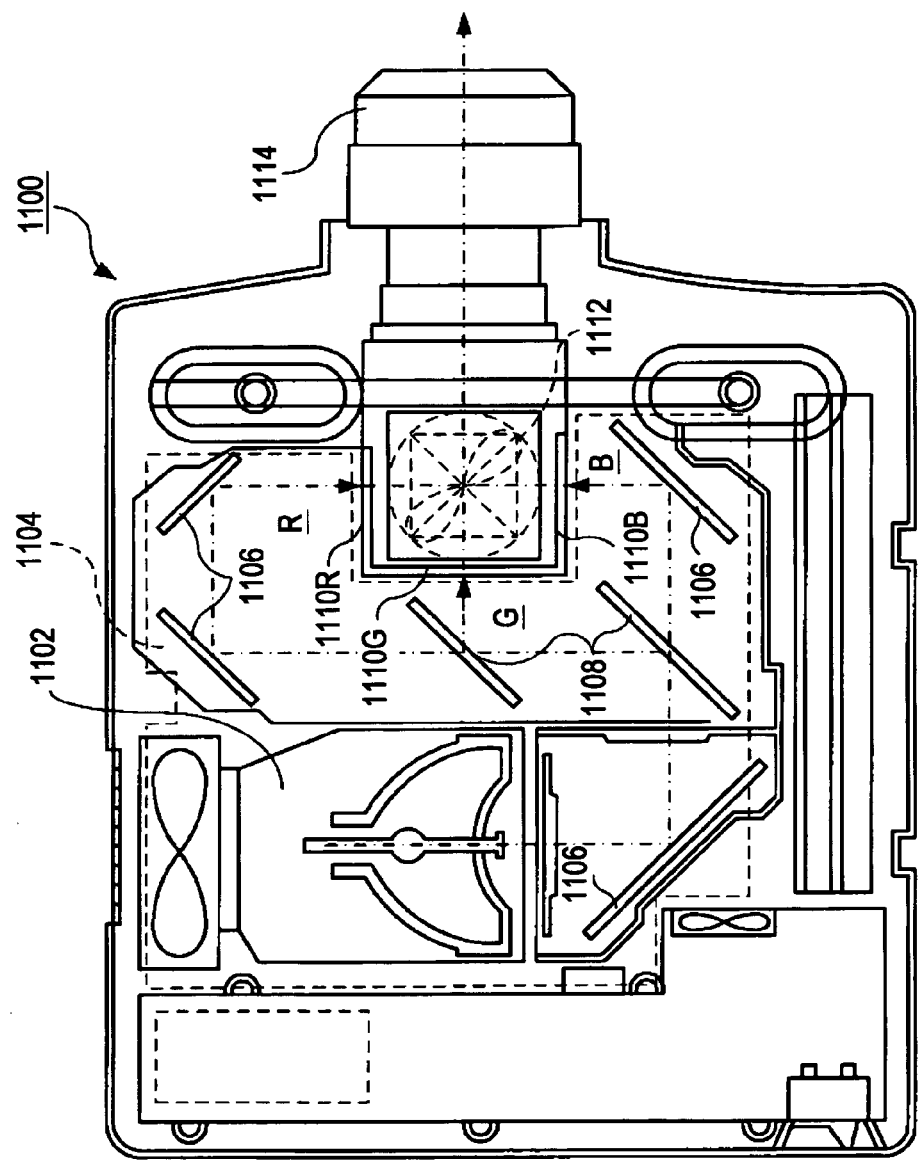
FIG. 6 is a plan view that schematically illustrates an example of the configuration of a projector, which is an example of electronic apparatuses to which an electro-optical device according to the invention is applied.

In the following description, an explanation is given of a projector that employs the above-described liquid crystal device, which is a non-limiting example of the electro-optical device according to the invention, as a light valve. FIG. 6 is a plan view that schematically illustrates an example of the configuration of a projector.

As illustrated in FIG. 6, a lamp unit 1102, which is made of a white light source such as a halogen lamp, is provided in a projector 1100. A projection light that is emitted from the lamp unit 1102 is separated into three primary color components of R, G, and B by four mirrors 1106 and two dichroic mirrors 1108 arranged in a light guide 1104. The separated primary color components of R, G, and B enter liquid crystal panels 1110R, 1110B, and 1110G, respectively, which function as light valves corresponding to the respective primary color components.

The configuration of the liquid crystal panel 1110R, 1110G, or 1110B is the same as or similar to that of the liquid crystal device described above. Each of these liquid crystal panels 1110R, 1110G, and 1110B is driven by the corresponding one of the primary color signals R, G, and B, which are supplied from an image signal processing circuit. Light subjected to optical modulation by one of these liquid crystal panels enters a dichroic prism 1112 from the corresponding one of three directions. Light of R color component and light of B color component are refracted at a 90-degree angle at the dichroic prism 1112, whereas light of G color component goes straight through the dichroic prism 1112. Therefore, as a result of combination of these color components, a color image is projected on a screen, etc., through a projection lens 1114.

Focusing attention on a display image offered by each of the liquid crystal panels 1110R, 1110G, and 1110B, it is necessary to reverse the display image of the liquid crystal panel 1110G in a mirror pattern (that is, to reverse the left side and the right side) with respect to the display images of the liquid crystal panels 1110R and 1110B.

Because light corresponding to each one of the primary colors R, G, and B enters into the corresponding one of the liquid crystal panel 1110R, 1110G, and 1110B thanks to the presence of the dichroic mirror 1108, it is not necessary to provide a color filter thereon.

Among a variety of electronic apparatuses to which the electro-optical device according to the invention could be embodied are, in addition to the electronic apparatus (projector) explained above with reference to FIG. 6, a mobile-type personal computer, a mobile phone, a liquid crystal display television, a viewfinder-type video recorder, a video recorder of a direct monitor view type, a car navigation device, a pager, an electronic personal organizer, an electronic calculator, a word processor, a workstation, a videophone, a POS terminal, a touch-panel device, and so forth. Needless to say, the invention is also applicable to these various electronic apparatuses without any limitation to those mentioned above.

In addition to the liquid crystal device explained in the embodiments described above, the invention is also applicable to a reflective liquid crystal display which has elements formed on a silicon substrate (LCOS, liquid crystal on silicon), a plasma display (PDP), a field emission display (FED), a surface-conduction electron-emitter display (SED), an organic EL display, a digital micro mirror device (DMD), an electrophoresis apparatus, to name a few.

The present invention should be in no case interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as appended claims. A heat dissipater subjected to such a modification, alteration, change, adaptation, and/or improvement, an electro-optical device having such a heat dissipater subjected thereto, and an electronic apparatus that is provided with such an electro-optical device, are also within the technical scope of the invention.

For example, although the embodiments describe the main body portion 100 as being rectangular in cross-section, the main body portion could be circular or oval in cross-section. Although the main body portion 100 is described as having an open portion 110 at a side thereof opposite to the side to which the integrated circuit 220 is adhered, the open portion could be provided in other sides of the main body portion 100. Also, the main body portion could be formed with a plurality of openings to improve heat dissipation.

The entire disclosure of Japanese Patent Application No. 2007-062977, filed Mar. 13, 2007 is expressly incorporated by reference herein.

What is claimed is:

1. An electro-optical device comprising:
an electro-optical panel;
a flexible substrate attached to the electro-optical panel, the flexible substrate including wiring,
an integrated circuit disposed on the flexible substrate, the integrated circuit controlling operations of the electro-optical panel through the wiring on the flexible substrate;
a main body section in the shape of a hollow sleeve, the integrated circuit being disposed inside the main body section; and
an adhering section on an inner surface of the main body section, the adhering section adhering the main body section and the integrated circuit together.

2. The electro-optical device according to claim 1, wherein the main body section has an open portion that extends along an axial direction of the main body section.

3. The electro-optical device according to claim 2, wherein, in the main body section, the open portion is formed at a region that includes at least a part of a region opposite to the adhering section.

4. The electro-optical device according to claim 1, wherein the main body section is fixed to the electro-optical panel.

5. An electronic apparatus that is provided with the electro-optical device according to claim 1.

* * * * *